Washington Bryant. Wagon Brake.

117147

PATENTED JUL 18 1871

Witnesses:
E. Wolff
Wm. H. C. Smith

Inventor:
Washington Bryant
PER
Munn & Co
Attorneys.

UNITED STATES PATENT OFFICE.

WASHINGTON BRYANT, OF BATESVILLE, ARKANSAS.

IMPROVEMENT IN WAGON-BRAKES.

Specification forming part of Letters Patent No. 117,147, dated July 18, 1871.

*To all whom it may concern:*

Be it known that I, WASHINGTON BRYANT, of Batesville, in the county of Independence and State of Arkansas, have invented a new and useful Improvement in Wagon-Brake; and I do hereby declare that the following is a full, clear, and exact description thereof, which will enable others skilled in the art to make and use the same, reference being had to the accompanying drawing forming part of this specification, in which—

Figure 1:
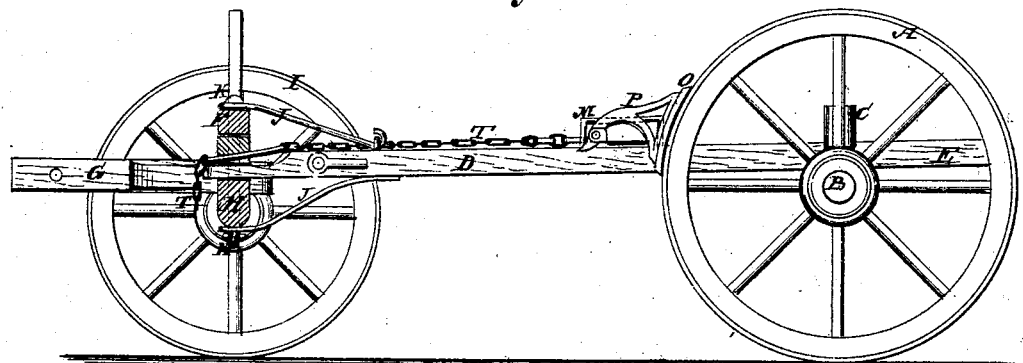
Figure 2:
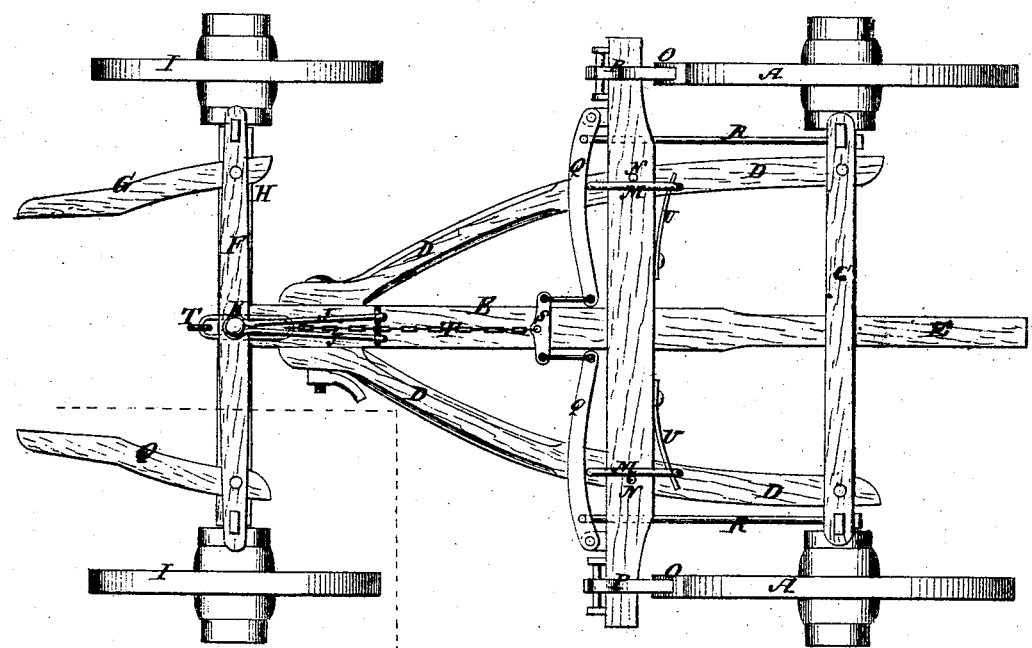

Figure 1 is a side view of a wagon, partly in section, through the line $x\ x$, Fig. 2, to which my improved brake has been attached. Fig. 2 is a top view of the same.

Similar letters of reference indicate corresponding parts.

This invention relates to an improvement in wagon-brakes which are automatically operated or applied; and the invention consists in the particular construction and arrangement of the brake-shoes, as hereinafter described, in connection with other parts necessary to form a complete brake apparatus.

A are the rear wheels. B is the rear axle. C is the rear bolster. D are the rear hounds. E is the reach. F is the forward bolster. G are the forward hounds. H is the forward axle, and I are the forward wheels. J are the braces, which are connected with the upper and lower ends of the king-bolt K, and the rear ends of which are attached to the reach E. L is a cross-bar, which is placed just in front of the rear wheels A and is kept in place laterally by passing through long keepers M attached to the rear hounds D. The bar L is kept in place longitudinally by pins N attached to said bar L at the sides of the keepers M, as shown in Fig. 2. O are the brake-shoes, which are attached to or formed upon the brackets P, which are pivoted to the forward side of the ends of the bar L. By this construction, when the bar L is pushed back and the wheels are moving forward, the friction of the wheels will cause the brake-shoes to hug the wheels more closely; but when the wheels begin to turn back the friction throws the brake-shoes O P upward and forward, allowing the wheels to turn back freely. The forward ends of the brackets P project, so that when the brake-shoes O P are thrown forward they may strike against the under side of the bar L and prevent the brake-shoes O P from being thrown so far forward that they will not drop back by their own weight. If desired, stops may be attached to the lower sides of the bar L for the projecting ends of the brackets P to strike against. Q are levers, placed a little in front of the brake-bar L, and which are pivoted near their outer ends to the forward ends of the rods R, the rear ends of which are attached to the rear axle B. The outer ends of the levers Q are pivoted to the bar L by means of eyebolts or other well-known means. The inner ends of the levers Q, which extend to or nearly to the reach E, are connected with the ends of a short equal-armed lever, S, by links, as shown in Fig. 2. To the center of the short equal-armed lever S is detachably attached a chain, T, which passes forward along the upper side of the reach E, and has a long link formed in it for the passage of the king-bolt K. The forward end of the chain may be attached to the tongue or to a rod extending along the tongue and connected with the breast-yoke by a short chain and ring. By this construction, when the team begins to hold back in going down hill the chain T is drawn forward, which draws the inner ends of the levers Q and applies the brake to the wheels with a force proportionate to the forward pressure of the wagon. By lengthening and shortening the rear part of the chain T the brake may be adjusted for use with a longer or shorter reach, as may be desired. U are springs, which are attached to the rear side of the brake-bar L, and the free ends of which pass through the keepers M and rest against the rear ends of said keepers, as shown in Fig. 2, so that when the draft upon the chain T is removed the said springs U may force the brake-bar L forward, withdrawing the brake-shoes O P from the wheels.

Having thus described my invention, I claim as new and desire to secure by Letters Patent—

The brake-shoes O P, pivoted on the front side of the bar L and provided with projecting forward ends, as and for the purpose specified.

WASHINGTON BRYANT.

Witnesses:
 WM. H. ROSA,
 THOMAS JOHNS.